United States Patent [19]
Cook

[11] Patent Number: 4,966,378
[45] Date of Patent: Oct. 30, 1990

[54] STONE SHIELD

[75] Inventor: Donald W. Cook, Downey, Calif.

[73] Assignee: Elixir Industries, Gardena, Calif.

[21] Appl. No.: 396,425

[22] Filed: Aug. 21, 1989

[51] Int. Cl.$^5$ ............................................ B62D 25/18
[52] U.S. Cl. ..................................... 280/154; 280/848;
280/851; 293/112
[58] Field of Search ...................... 280/153.5, 154, 847,
280/848, 851; 293/112, 115, 141

[56] References Cited

U.S. PATENT DOCUMENTS

| | | | |
|---|---|---|---|
| 843,072 | 2/1907 | Collier | 280/848 X |
| 923,849 | 6/1909 | Jones | 280/848 |
| 2,012,921 | 8/1935 | Bahr | 280/851 |
| 2,078,679 | 4/1937 | Golphin | 293/112 X |
| 2,310,410 | 2/1943 | Ferguson | 293/112 |
| 2,605,119 | 7/1952 | Earnest | 280/848 X |
| 2,777,710 | 1/1957 | Panchesine | 280/851 |
| 2,782,053 | 2/1957 | Long | 280/851 |
| 2,809,848 | 10/1957 | Carswell | 280/851 |
| 2,826,428 | 3/1958 | Lincoln | 280/851 |
| 3,195,920 | 7/1965 | Knisely et al. | 280/851 |
| 3,485,284 | 12/1969 | Turner et al. | 292/101 X |
| 3,700,260 | 10/1972 | Moore et al. | 280/851 |
| 3,746,366 | 7/1973 | Bruce et al. | 280/851 |
| 4,413,839 | 11/1983 | McCain | 280/851 |
| 4,640,541 | 2/1987 | FitzGerald et al. | 280/851 X |

FOREIGN PATENT DOCUMENTS 0021317 of 1910 United Kingdom ................ 280/848

Primary Examiner—Charles A. Marmor
Assistant Examiner—Brian L. Johnson
Attorney, Agent, or Firm—Poms, Smith, Lande & Rose

[57] ABSTRACT

A stone shield adjustably attachable to the rear bumper of a pick-up truck extends substantially across the vehicle for protection of a load being towed. The stone shield is mounted to the bumper by brackets that may be adjustably positioned forwardly or rearwardly to allow proper positioning of the shield in the space ahead of the rear bumper and to facilitate alignment of hinge clips for the shield.

21 Claims, 1 Drawing Sheet

U.S. Patent    Oct. 30, 1990    4,966,378
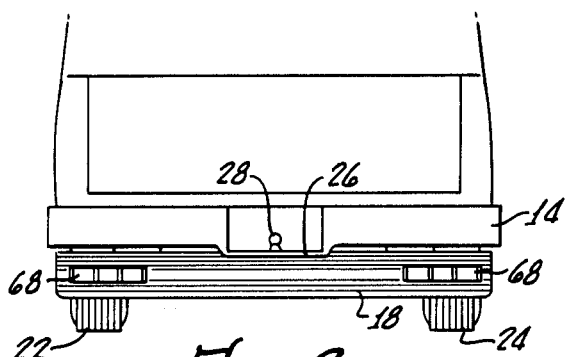
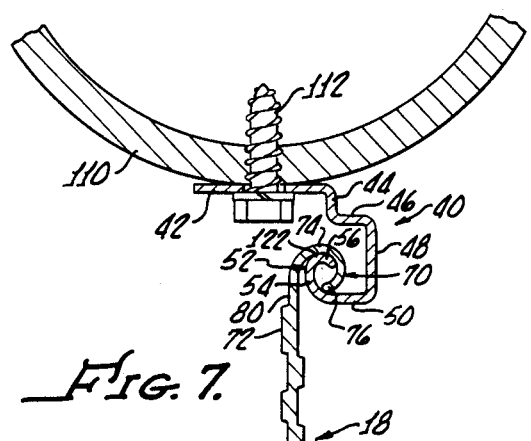
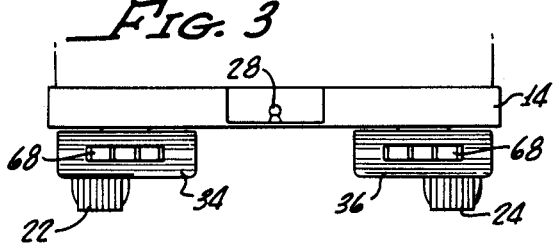
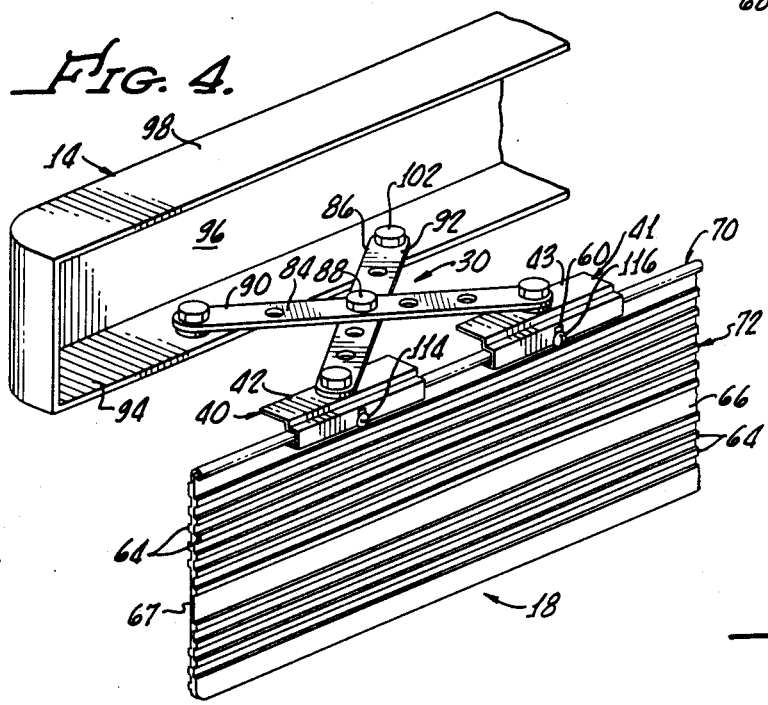
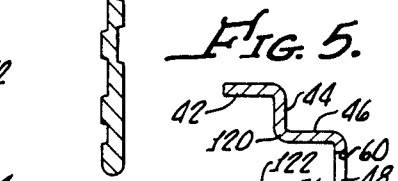
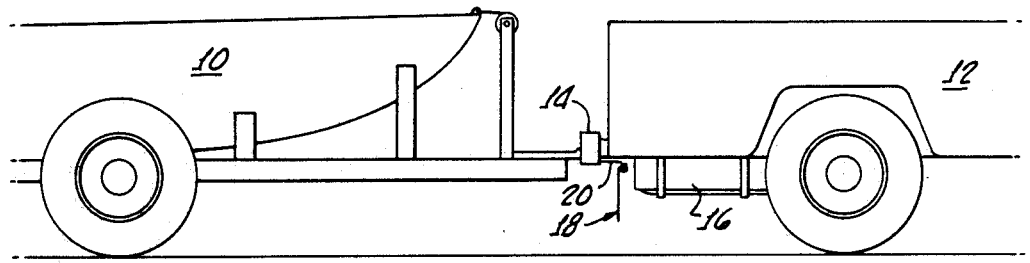

STONE SHIELD

BACKGROUND OF THE INVENTION

The present invention relates to the protection of loads towed by an automotive vehicle and more particularly concerns a bumper mounted stone shield of effective configuration and installation.

House trailers and trailer-mounted loads such as boats are often towed long distances over roads of varying condition. During such towing, the towed loads are subjected to stones and other road debris forcefully hurled rearwardly at high velocity from beneath the towing vehicle. Continuation of the impact of such debris over long periods of time causes not only a significant degradation of appearance of the front portion of the towed load, but may also result in severe physical damage to the load.

Stone shields in the past have been mounted immediately behind the rear wheels, extending transversely only for the width of the wheel. Such shields are effective against stones and debris thrown back only in a straight line. Much debris is thrown off at an angle from the wheels and often from beneath a more central portion of the towing vehicle so that the prior devices are of little or no effect against such debris. For example, the flaps or splash guards shown in the U.S. Pat. Nos. to D. S. Long, 2,782,053, C. D. Carswell, 2,809,848, H. A. Lincoln, 2,826,428, and V. D. Knisely et al, 3,195,920 are bolted to fixed parts of a truck for permanent installation, and hang down solely behind the rear wheels, leaving the space between the wheels free and open to the passage of high speed stones and other debris from beneath the towing vehicle. The devices of the prior art are not readily mountable, and, moreover, are not adjustable. Most are not useful with a common vehicle, such as a pick-up truck having one of several common types of rear bumper.

Accordingly, it is an object of the present invention to provide efficient and effective protection for a towed load.

SUMMARY OF THE INVENTION

In carrying out principles of the present invention in accordance with a preferred embodiment thereof, a plurality of clips having hinge sections are secured to a rear bumper of a vehicle at mutually spaced locations along the bumper and in mutual alignment with one another. A stone shield having a body and a hinge section is pivotally interconnected to the clips by a longitudinally sliding hinged interconnection between the shield and the clips, whereby the stone shield is pivotally suspended from the bumper and extends longitudinally along a major part of the length of the bumper. In one embodiment, the clips are secured to the bumper to extend adjustably forward therefrom by means of extensible brackets that are adjustably secured to the bumper. A unique longitudinal sliding interconnection of the stone shield hinge section with the hinge section of the clips allows slidable and pivotal interengagement of the hinge sections. The adjustable brackets which mount the hinge clips allow precise positioning of the stone shield in the often narrow space ahead of the bumper and to the rear of other portions of the towing vehicle, such as a spare wheel carried at a lower part of the towing vehicle. The brackets also facilitate mutual alignment of individual hinge clips so that a one piece elongated hinge member of the stone shield may be slidably interengaged with all the clips by longitudinally sliding the hinge member of the stone shield through the aligned clips, one at a time.

BRIEF DESCRIPTION OF THE DRAWINGS

FIG. 1 is a simplified illustration of a portion of a towed load and towing vehicle with a stone shield embodying principles of the present invention secured to the vehicle;

FIG. 2 is a rear view of a towing vehicle having a stone shield installed thereon;

FIG. 3 is a view similar to FIG. 2 showing a two part stone shield;

FIG. 4 is a fragmentary pictorial illustration of a vehicle bumper, mounting bracket, hinge clips and stone shield constructed in accordance with an embodiment of the present invention;

FIGS. 5 and 6 illustrate the cross sections of the extrusions which form the clip and stone shield hinge sections respectively; and FIG. 7 is a vertical section showing the stone shield of the present invention mounted to a different type of bumper.

DETAILED DESCRIPTION OF THE INVENTION

Illustrated in FIG. 1 is a load, such as a trailered boat 10, towed behind a vehicle, such as a pick-up truck 12, having a rear bumper 14 and a spare wheel and tire 16 stored below a rear portion of the truck body, just ahead of the bumper 14. A stone shield 18 is mounted to depend from a plurality of mounting brackets 20 that are fixed to and extend forwardly of a lower portion of bumper 14.

As illustrated in the rear elevation view of FIG. 2, the stone shield 18 extends substantially for the full length of the bumper 14, completely across the vehicle and across both of the rear wheels 22,24 of the vehicle, extending not only across the space between the wheels but also just beyond the outside of the wheels.

One type of common bumper 14 has a centrally positioned, slightly lowered section 26, where a conventional trailer hitch 28 is positioned. Nevertheless, the upper portion of the full width continuous stone shield 18 may be positioned close to the bottom of the bumper 14 on either side of the central section 26, because the stone shield is secured to the bumper by means of a plurality of forwardly extending brackets 30 (see FIG. 4), which enable the stone shield to clear the central depending section 26 of the bumper even though the upper end of the shield may be at the same level or above the lower end of the depending central bumper section.

FIG. 3 illustrates a modified arrangement of the stone shield in which the latter is made in two pieces 34 and 36, which are identical, except in overall length, to the stone shield 18.

The stone shield is mounted to the bumper by means of a plurality of mounting clips, such as the pair of clips 40,41 shown in FIG. 4 adjacent one end of the bumper. It will be understood that a like pair of clips is employed at the other end of the bumper to support the other end of the stone shield.

Additional clips or pairs of clips may be employed at intermediate positions if deemed necessary or desirable. Each clip is formed as an extrusion of a strong corrosion resistant and light weight metal, such as aluminum for example, and has a mounting flange 42 connected by means of an angulated connecting wall 44,46 (FIG. 5) to a downwardly extending forward wall 48. Forward wall 48 is connected to a rearwardly extending bottom or horizontal wall 50, at the rearward end of which is formed a clip hinge section 52 in the form of a curved retainer wall, curving rearwardly and upwardly, as at 54, and then forwardly and downwardly to a free end 56. The curved retainer wall has a somewhat cylindrical longitudinal configuration, with an opening 58 formed between the free end 56 and the bottom horizontal wall 50. A slot 60 (FIG. 4) is cut in the bottom wall 50 and extends upwardly along a part of retainer wall 54 and along forward wall 48 adjacent to the angulated wall section 46 for purposes to be described hereinafter.

Stone shield 18, as best seen in FIGS. 4 and 7, is an elongated, flat extrusion of a similar strong, light weight corrosion resistant metal, such as aluminum, extruded to have a plurality of longitudinally extending corrugations 64 on both front and back surfaces. Intermediate portion 66 on a forwardly facing side, and a larger intermediate portion 67 on the rearwardly facing side of the stone shield are made free of corrugations for at least a portion of the shield length to permit the mounting of suitable running lights 68 (shown in FIGS. 2, 3 and 7, but not shown in FIG. 4) that are bolted to the stone shield body, as by bolts 69.

Running continuously along the upper edge of the stone shield is a hinge section 70 formed integrally with the stone shield body 72 and having an upwardly and forwardly curved hinge wall 74, including a downwardly and rearwardly curved free end 76. The stone shield hinge section 70 also has an elongated, somewhat cylindrical configuration including a longitudinally extending opening 78 formed between the free end 76 and a vertical portion 80 of hinge wall 74.

Pairs of brackets 30 (only one pair is shown in FIG. 4) are each formed of first and second brace plates 84,86 pivotally connected to one another by a bolt and nut 88 at a substantially central portion thereof. Proximate ends 90,92 of the plates 84,86 respectively are bolted to a lower horizontal flange 94 of bumper 18, which, as can be seen in FIG. 4, is of c-shaped cross section, having a rearwardly facing web 96 interconnecting the lower bumper flange or wall 94 with an upper bumper flange or wall 98.

The distal ends of the brace plates 84,86 are bolted to the mounting flanges 42,43 of hinge clips 40,41 respectively. The hinge clips are adjustably positioned at a selected distance ahead of the bumper by pivoting the brace plates 84,86 relative to one another before the second brace plate 86, for example, is bolted to the bumper flange 94. The hole through the flange 94 for reception of a bolt 102, which secures the proximate end 92 of brace plate 86 to the bumper, is drilled only after the clips are properly positioned at the desired distance ahead of the bumper and are properly longitudinally aligned (in a direction parallel to the length of the bumper and along the length of the stone shield).

The stone shield is adjustably connected and interengaged with the mutually aligned hinge clips 40,41 when it is mounted on a bumper of c-shaped cross section, such as that illustrated in FIG. 4. It will be readily appreciated that, if deemed necessary or desirable, the clips 40,41 may be bolted directly to the flange without the use of the brace plates 84,86. However, these brace plates allow forwardly extending adjustable positioning of the clips, and, moreover, facilitate mutual alignment of the clips for the slidable interengagement of the interconnecting hinge sections of clips and stone shield.

Illustrated in FIG. 7 is an arrangement where the clips and stone shield that are shown in FIG. 4 are directly secured to a bumper 110 of round cross section by means of sheet metal screws 112 extending through the clips and threaded into holes formed at the bottom of the bumper 110. It will be understood that the clips are formed with suitable pre-drilled holes in their mounting flanges 42.

The described stone shield is preferably manufactured and sold as a kit comprising an extruded stone shield body with its integral hinge section, four hinge clips, such as 42,43 and two pairs of brace plates 84,86, together with suitable bolts, screws, washers and lights.

To install the stone shield, a first pair of brace plates 84,86 is positioned substantially as illustrated in FIG. 4 adjacent one end of the bumper with the brace plates extending forwardly from the lower bumper flange. The proximate end 90 of one of the brace plates is bolted to the bumper flange after a suitable hole is drilled in the latter, and the brace plates of the first pair are then pivoted relative to one another in order to properly obtain the desired fore and aft positioning of the distal ends (to which the hinge clips 42 43 will be connected) of the brace plates. One hinge clip is then bolted to the distal end of one brace plate of a pair, and the two brace plates of each pair are pivotally adjusted relative to one another about the axis of bolt 88, so as to position the clips at the desired distance ahead of the bumper and to ensure mutual longitudinal alignment of the two clip hinge sections.

The fore and aft position of the hinge clips is adjusted by the relative pivotal motion of the brace plates in order to allow the stone shield to hang freely from the hinge clips in a clear space ahead of the bumper but behind other parts of the vehicle, such as the spare wheel 16, for example. The remaining unconnected brace plate ends are then bolted to the bumper and hinge clips. The same procedure is then undertaken for mounting a second mounting bracket (not shown) which is identical to the bracket 30, and also mounting a pair of additional hinge clips on such second bracket, all being arranged at the other end of the bumper. Preferably both brackets (e.g. all four brace plates) are adjusted for optimum positioning and mutual alignment before the ends of the second brace plate of each pair are secured to the bumper and clip respectively. Now, with the four mounting clips or hinge clips firmly secured to the distal ends of the pairs of brackets, and all in mutual longitudinal alignment with each other, the hinge section of the stone shield is longitudinally slid into each of the clip hinge sections from one end. One end of the stone shield hinge section first enters an outermost one of the clip hinge sections, then is slidably driven or pushed through this hinge clip, through the second clip, and thence through the third and fourth clips. The stone shield is then longitudinally adjusted to center it with respect to the bumper. At this time the hinge section of the stone shield is slidably and pivotally interengaged with the hinge section of the four clips. The open cylindrical construction of the two hinge sections enables the interengaged parts to readily pivot about the longitudinal axis of the stone shield hinge section. At this time the latter is still longitudinally slidable. Pivotal freedom is desired but sliding freedom is not. To prevent further sliding, fastening members such as sheet metal screws 114,116 are inserted through the slots, such as slot 60 of the hinge clips, and threaded into engagement with the forwardly facing portion of the hinge wall 74 of the stone shield hinge section. The body of each of the screws 116,114 is free to move upwardly and downwardly within the slots of the hinge clips, and thus the screws do not significantly restrict pivotal motion of the stone shield relative to the hinge clips. However, the screws will prevent any relative sliding of the stone shield with respect to the mounting clips so that the stone shield cannot be withdrawn from its pivotal engagement with the clips unless and until the screws 114,116 are removed. It will be readily understood that only a single one of the screws 114,116 is needed to prevent the longitudinal disengagement and detachment of the stone shield.

Although the stone shield is free to pivot with respect to the hinge clips, it cannot be detached from the hinge clips by any type of pivotal motion because of the relative dimensions and configurations of the parts, as best seen in FIGS. 5 through 7. Thus the effective size of the hinge section of the stone shield is greater than the distance between a corner 120 of the angulated wall 44,46 of the hinge clip and an uppermost portion 122 of the hinge section 52. Therefore the stone shield cannot be accidentally detached, but is easily detached when desired simply by removing the screw or screws 114,116 and longitudinally sliding the stone shield from its interengaging pivotal connection with the several clip hinge sections.

FIGS. 1 through 7 show a presently preferred configuration of hinge sections of a clip and stone shield. It will be readily appreciated that variations on this configuration may be readily made without departing from principles of the present invention. Many other configurations are known and available for slidably and pivotally interengaging the stone shield and hinge clip and may be employed in the place of the configurations illustrated in FIGS. 5, 6 and 7.

There have been described stone shield configurations and methods of protecting a towed load which are effective, efficient, inexpensive and easy to install. A hingedly mounted stone shield is adjustably positioned just ahead of the towing vehicle rear bumper, and to clear other equipment such as a spare wheel, by means of a unique adjustable bracket and hinge clip arrangement that allows ready assembly and disassembly of the stone shield. The latter may be removed without removing either the supporting brackets or hinge clips, which remain hidden and positioned in a non-interfering location.

The foregoing detailed description is to be clearly understood as given by way of illustration and example only, the spirit and scope of this invention being limited solely by the appended claims.

What is claimed is:

1. A method of providing protection against stones and debris thrown rearwardly by a vehicle having a rear bumper, comprising the steps of:
   providing a plurality of clips having hinge sections,
   operatively securing said clips to said rear bumper at mutually laterally spaced locations along and forwardly of the bumper,
   adjusting the clips toward and away from said rear bumper to place said hinge sections in mutual longitudinal alignment along the length of said bumper,
   providing a stone shield having a body and a hinge section extending longitudinally along an upper edge thereof and
   pivotally interconnecting said stone shield and clips by longitudinally sliding said stone shield hinge section into and through said hinge sections of said clips, whereby said stone shield is pivotally suspended from said bumper and extends longitudinally along at least part of the length of the bumper.

2. The method of claim 1 including securing said stone shield to at least one of said clips to prevent relative longitudinal movement thereof.

3. The method of claim 2 wherein said step of securing said stone shield comprises forming a vertical slot in said at least one clip, positioning a fastener in said slot and securing the fastener to said stone shield.

4. The method of claim 1 wherein said step of securing said clips comprises the steps of securing a plurality of adjustable brackets to said bumper, adjustably positioning unsecured ends of the brackets at selected locations spaced forwardly of said bumper, and securing said clips to said bracket ends, whereby said clip and stone shield may be positioned for selected adjustment toward and away from said bumper.

5. A method of providing protection against stones and debris thrown rearwardly by a vehicle having a rear bumper, comprising the steps of:
   providing a plurality of clips having hinge sections,
   operatively securing said clips to said rear bumper at mutually spaced locations of the bumper,
   adjusting the clips to place said hinge sections in mutual longitudinal alignment along the length of said bumper,
   providing a stone shield having a body and a hinge section extending longitudinally along an upper edge thereof, and
   pivotally interconnecting said stone shield and clips by longitudinally sliding said stone shield hinge section into and through said hinge sections of said clips, whereby said stone shield is pivotally suspended from said bumper and extends longitudinally along at least part of the length of the bumper, said step of securing said clips comprising the steps of securing a plurality of adjustable brackets to said bumper, adjustably positioning unsecured ends of the brackets at selected locations spaced forwardly of said bumper, and securing said clips to said bracket ends, whereby said clip and stone shield may be positioned for selected fore and aft adjustment toward and away from said bumper, said step of securing brackets comprising providing a pair of pivotally interconnected brace plates, each having proximate and distal ends, pivotally securing one of said proximate ends to said bumper, securing one of said clips to one of said distal ends, adjusting and aligning positions of said clips by pivoting said brace plates relative to one another, and securing the others of said brace plate ends to said bumper and clips.

6. A stone shield for a vehicle having a rear bumper comprising:
   a plurality of mounting clips, each having a mounting flange and a hinge section fixed to and spaced from said flange,
   means for securing said clips to a rear bumper at mutually laterally spaced locations along said bumper with said hinge sections in mutual longitudinal alignment, means for adjusting the clips toward and away from said rear bumper, a stone shield having a body and a shield hinge section extending longitudinally along an upper edge of said body, said shield hinge section being pivotally and longitudinally slidably received in said aligned hinge sections of said clips, whereby said stone shield is pivotally suspended from said clips and extends along at least part of the length of said bumper.

7. The stone shield of claim 6 wherein at least one of said clip hinge sections includes a horizontal wall spaced below said mounting flange and having a rearward portion and a curved retainer wall curving rearwardly and upwardly from said rearward portion, said curved retainer wall having a forwardly curved free end portion, said stone shield hinge section having a hinge wall pivotally interengaged with said clip hinge section walls and extending in a generally circular curve upwardly and forwardly, and terminating in a downwardly and rearwardly curved free end spaced from said stone shield body and below said free end portion of said clip hinge section.

8. The stone shield of claim 7 wherein said bumper is substantially straight and extends across substantially the full width of said vehicle, said stone shield being substantially straight and having a length substantially equal to the length of said bumper.

9. The stone shield of claim 6 wherein each said clip hinge section includes an upwardly and rearwardly curved hinge retainer wall, and wherein said stone shield hinge section includes a forwardly and downwardly curved hinge wall extending about and being pivotally interengaged with said retainer wall, said hinge wall being pivotally captured within and longitudinally slidable relative to said curved hinge retainer wall, and means for restraining relative longitudinal sliding of said retainer and hinge walls while allowing relative pivotal motion.

10. The stone shield of claim 6 wherein said means for adjusting comprises a plurality of brackets having means for length adjustment and configured to be secured at one end to said bumper and at the other end to at least one of said clips.

11. The stone shield of claim 6 wherein each said clip and shield hinge section comprises a curved hinge wall forming a partially open somewhat cylindrical hinge member, the surfaces of said clip and shield hinge sections being slidably and pivotally interengaged with one another, said hinge members defining longitudinally extending openings, defined in part by a free end of the hinge members, said free ends of each of said clip and stone shield hinge member being received within the opening of the other.

12. The stone shield of claim 6 wherein said stone shield hinge section comprises a continuous extrusion, and wherein said clip hinge sections comprise a plurality of relatively short mutually spaced extrusions.

13. A stone shield for a vehicle having a rear bumper comprising:

a plurality of mounting clips, each having a mounting flange and a hinge section fixed to and spaced from said flange, means for securing said clips to a rear bumper at mutually spaced locations along said bumper with said hinge sections in mutual longitudinal alignment, a stone shield having a body and a shield hinge section extending longitudinally along an upper edge of said body, said shield hinge section being pivotally received in said aligned hinge sections of said clips, whereby said stone shield is pivotally suspended from said clips and extends along at least part of the length of said bumper, each said clip hinge section including an upwardly and rearwardly curved hinge retainer wall, said stone shield hinge section including a forwardly and downwardly curved hinge wall extending about and being pivotally interengaged with said retainer wall, said hinge wall being pivotally captured within and longitudinally slidable relative to said curved hinge retainer wall, and means for restraining relative longitudinal sliding of said retainer and hinge walls while allowing relative pivotal motion, said means for restraining comprising a vertically extending downwardly open slot in said clip, and an elongated slide stop member fixed to said stone shield hinge section and extending through said slot.

14. A stone shield for a vehicle having a rear bumper comprising:

a plurality of mounting clips, each having a mounting flange and a hinge section fixed to and spaced from said flange, means for securing said clips to a rear bumper at mutually spaced locations along said bumper with said hinge sections in mutual longitudinal alignment, a stone shield having a body and a shield hinge section extending longitudinally along an upper edge of said body, said shield hinge section being pivotally received in said aligned hinge sections of said clips, whereby said stone shield is pivotally suspended from said clips and extends along at least part of the length of said bumper, each said clip hinge section including an upwardly and rearwardly curved hinge retainer wall, said stone shield hinge section including a forwardly and downwardly curved hinge wall extending about and being pivotally interengaged with said retainer wall, said hinge wall being pivotally captured within and longitudinally slidable relative to said curved hinge retainer wall, and means for restraining relative longitudinal sliding of said retainer and hinge walls while allowing relative pivotal motion, at least one of said brackets comprising first and second elongated brace plates pivotally connected together at intermediate points between proximate and distal ends thereof, said proximate ends being configured for attachment to mutually spaced points along said bumper, the distance between said proximate ends being selected to define a chosen length of said bracket, and means for securing first and second ones of said clips to respective ones of said distal ends.

15. In combination with a vehicle having a rear bumper, a stone shield assembly connected to block rearward passage of stones and other road debris thrown rearwardly by the vehicle, said stone shield assembly comprising:

first and second brackets fixed to said bumper and extending forwardly therefrom, a pair of mounting clips fixed to each of said brackets, all of said mounting clips being mutually aligned, each said mounting clip comprising a plurality of integrally connected walls including:
a horizontal, rearwardly extending mounting wall,
a forward wall depending from a forward portion of said mounting wall,
a bottom wall extending rearwardly from said forward wall, and
a curved retainer wall curving rearwardly and upwardly from said bottom wall and having a forwardly curved free end portion spaced from said forward wall,
a stone shield comprising:
an elongated thin wall body extending along the length of said bumper, and
a hinge wall extending in a generally circular curve upwardly and forwardly from an upper edge of said body, and terminating in a downwardly and rearwardly curved free end spaced from said body, said stone shield wall being slidably received in and pivotally interengaged with said aligned mounting clips.

16. In combination with a vehicle having a rear bumper, a stone shield assembly connected to block rearward passage of stones and other road debris thrown rearwardly by the vehicle, said stone shield assembly comprising:
first and second brackets fixed to said bumper and extending forwardly therefrom,
a pair of mounting clips fixed to each of said brackets, all of said mounting clips being mutually aligned,
each said mounting clip comprising a plurality of integrally connected walls including:
a horizontal, rearwardly extending mounting wall,
a forward wall depending from a forward portion of said mounting wall,
a bottom wall extending rearwardly from said forward wall, and
a curved retainer wall curving rearwardly and upwardly from said bottom wall and having a forwardly curved free end portion spaced from said forward wall, a stone shield comprising:
an elongated thin wall body extending along the length of said bumper,
a hinge wall extending in a generally circular curve upwardly and forwardly from an upper edge of said body, and terminating in a downwardly and rearwardly curved free end spaced from said body, said stone shield hinge wall being slidably received in and pivotally interengaged with said aligned mounting clips,
a vertically extending open slot in at least one of said mounting clips, and
a screw secured to said stone shield hinge wall and extending through said slot.

17. In combination with a vehicle having a rear bumper, a stone shield assembly comprising a substancially flat elongated sheet having a length equal to at least a major part of the length of said bumper and connected to block rearward passage of stones and other road debris thrown rearwardly by the vehicle, said stone shield assembly comprising:
first and second brackets fixed to said bumper and extending forwardly therefrom,
a pair of mounting clips fixed to each of said brackets, all of said mounting clips being mutually aligned,
each said mounting clip comprising a plurality of integrally connected walls including:
a horizontal, rearwardly extending mounting wall,
a forward wall depending from a forward portion of said mounting wall,
a bottom wall extending rearwardly from said forward wall, and
a curved retainer wall curving rearwardly and upwardly from said bottom wall and having a forwardly curved free end portion spaced from said forward wall,
a stone shield comprising:
an elongate thin wall body extending along the length of said bumper, and
a hinge wall extending in a generally circular curve upwardly and forwardly from an upper edge of said body, and terminating in a downwardly and rearwardly curved free end spaced from said body, said stone shield wall being slidably received in and pivotally interengaged with said aligned mounting clips.

18. The apparatus of claim 17 wherein said sheet is longitudinally corrugated.

19. The apparatus of claim 17 wherein a rearwardly facing portion of said sheet is free of corrugations, and including a plurality of lights secured to said portion of said sheet.

20. The apparatus of claim 17 including adjustable bracket means for fixedly connecting said clips to said bumper in mutual longitudinal alignment, said bracket means extending forwardly of said bumper, whereby said stone shield hangs downwardly at a distance forward of said bumper.

21. The apparatus of claim 17 wherein said vehicle includes rear wheels, and wherein said stone shield has a length greater than the distance between outer parts of said wheels, whereby the stone shield extends outwardly beyond said rear wheels and continuously between said wheels.

* * * * *